United States Patent [19]

Weiss et al.

[11] Patent Number: 5,798,164
[45] Date of Patent: Aug. 25, 1998

[54] ZONE TEXTURED MAGNETIC RECORDING MEDIA

[75] Inventors: Joel R. Weiss, Fremont; Koji Shima, Saratoga; Joseph Leigh; Hiroshi Konishi, both of Cupertino, all of Calif.; Nobuo Kurataka, Itami, Japan; Hiroki Hara, Itami, Japan; Naoki Inoue, Itami, Japan

[73] Assignee: Stormedia, Inc., Santa Clara, Calif.

[21] Appl. No.: 503,785

[22] Filed: Jul. 18, 1995

Related U.S. Application Data

[60] Provisional application No. 60/000,434 Jun. 23, 1995.
[51] Int. Cl.⁶ ............................................. G11B 5/64
[52] U.S. Cl. ................ 428/141; 428/65.3; 428/694 TR; 428/694 BR; 428/694 SG; 428/900; 427/129; 360/135
[58] Field of Search .................. 428/694 TR, 694 BR, 428/65.3, 694 SG, 141, 900; 427/129; 156/645; 360/135

[56] References Cited

U.S. PATENT DOCUMENTS

| | | |
|---|---|---|
| 4,786,564 | 11/1988 | Chen et al. .................. 428/694 TS |
| 5,062,021 | 10/1991 | Ranjan et al. ................. 360/135 |
| 5,108,781 | 4/1992 | Ranjan et al. ................. 427/53.1 |
| 5,314,745 | 5/1994 | Okumura ......................... 428/336 |
| 5,506,017 | 4/1996 | Ranjan et al. .................. 428/65.7 |
| 5,550,696 | 8/1996 | Nguyen .......................... 360/135 |
| 5,586,040 | 12/1996 | Baumgart et al. ............. 364/474.08 |

*Primary Examiner*—Stevan A. Resan
*Attorney, Agent, or Firm*—Townsend and Townsend and Crew LLP

[57] ABSTRACT

Magnetic recording media are provided having separately textured data and read/write head landing zones. Separating these zones on the recording surface allows independent optimization of the topology to maximize both recording characteristics and mechanical durability. The landing or contact start stop zone has an average surface roughness greater than that of the data zone. Preferably, a transition zone extends between the contact start stop zone and the data zone, the transition zone varying between the two in average surface roughness. Preferably, the contact start stop zone is textured first, followed by the data zone, thereby ensuring uniform stiction performance. Texture machines for producing such zone texturing and texturing methods are also provided.

15 Claims, 10 Drawing Sheets

ZONE TEXTURED MAGNETIC RECORDING MEDIA

This application is a continuation-in-part of Provisional Application Ser. No. 60/000,434 filed on Jun. 23, 1995, the full disclosure of which is incorporated herein by reference.

BACKGROUND OF THE INVENTION

1. Field of the Invention

The present invention relates to generally to magnetic recording media, and more particularly to recording media having a landing zone with an independently optimized surface texture.

Figure 1:
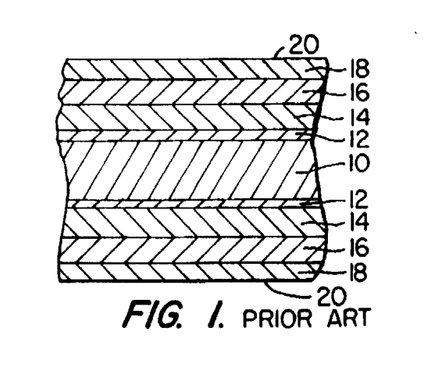
FIG. 1 is a cross-sectional view of an exemplary prior art magnetic recording disk, as described in the background section hereinabove.

Magnetic recording disks generally comprise a disk substrate having a magnetic layer and a number of underlayers and overlayers deposited thereon. The nature and composition of each layer is selected to provide desired magnetic recording characteristics. An exemplary present day disk is illustrated in FIG. 1 and comprises a non-magnetic disk substrate 10 typically composed of an aluminum alloy. Alternative substrates comprise non-metallic materials such as glass, ceramics, glass ceramic composites, carbon, carbon ceramic composites, and the like. Generally, an amorphous nickel phosphorus (Ni—P) layer 12 is formed over each surface of disk substrate 10, typically by plating. The Ni—P layer is hard, and imparts rigidity to aluminum alloy substrates. A chromium ground layer 14 is formed over the Ni—P layer 12, typically by sputtering, and the magnetic layer 16 is formed over the ground layer 14. The magnetic layer 16 comprises a thin film of a ferromagnetic material, typically including an alloy of cobalt. Usually, a protective layer 18, such as a carbon film, is formed over the magnetic layer 16, and a lubricating layer 20 is formed over the protective layer.

The presence of the Ni—P layer 12 and the chromium ground layer 14 has been found to improve the recording characteristics of the magnetic layer 16. In particular, the chromium ground layer formed over an Ni—P layer has been found to provide enhanced coercivity and reduced noise characteristics. Such improvements are further enhanced when the Ni—P layer is treated by mechanical texturing to create a roughened surface prior to formation of the chromium ground layer. The texturing may be circumferential or crosswise, with the preferred geometry depending on the particular composition of the cobalt-containing magnetic layer.

Such magnetic recording disk structures have been very successful and allow for high recording densities. As with all successes, however, it is presently desired to provide magnetic recording disks having even higher recording densities. Recording densities can be improved by reducing the spacing between the recording transducer (read/write head) and the magnetic disk surface while the disk is rotating. In modern magnetic recording systems, the read/write head often glides over the recording surface on an "air bearing," a layer of air which moves with the rotating disk. Thus, the spacing between the read/write head and recording surface, referred to as the "glide height," depends in part on the surface topology of the disk.

Surface topology affects both the magnetic recording characteristics and durability of magnetic recording media. Surface topology is often measured by surface roughness (Ra), the arithmetic average of the absolute height and depth of peaks and valleys in a profiler scan. Recording densities generally benefit from low glide heights which are associated with smooth recording surfaces having a low surface roughness. As might be expected, magnetic recording media noise, as measured in terms of bit shift, increases as roughness increases. Furthermore, certification errors per data track, the number of individual bits which exhibit less than a threshold percentage of the nominal signal strength, also increase with increasing roughness. Thus, magnetic recording characteristics generally benefit from recording surfaces having a relatively low average surface roughness.

Unfortunately, the reliability of magnetic recording systems generally improves with increased recording surface roughness. Smooth surfaces do not build up the moving layer of air over the disk's surface required to "fly" the read/write head as quickly as rough surfaces. Frictional contact between the rotating disk and read/write head, called "stiction," is particularly problematic during start up and stopping of the magnetic recording system, and has a profound impact on the durability of magnetic recording media.

For these reasons, it would be desirable to provide improved magnetic recording media having optimized surface topologies and methods for their fabrication. It would be particularly desirable if such recording media provided improved magnetic recording characteristics of low surface roughness without compromising the mechanical durability of magnetic recording systems. The methods should provide for texturing the substrate or layer structure of magnetic recording media without greatly increasing production costs and capital equipment requirements.

2. Description of the Background Art

U.S. Pat. No. 4,786,564 describes the texturing of a nickel phosphorus layer over an aluminum substrate to enable a read/write head to fly over the surface of the disk. U.S. Pat. No. 5,314,745 describes a magnetic recording media having a glass substrate with an optionally textured Ni—P layer.

SUMMARY OF THE INVENTION

Magnetic recording media according to the principles of the present invention comprise a read/write head interaction surface including a contact start stop zone having a relatively high surface roughness to improve durability, and data zone having a relatively low surface roughness as compared to the contact start stop zone to improve magnetic recording characteristics. As used herein, a "read/write head interaction surface" means the surface over which the head glides, lands, rests or slides during standard operation of a magnetic recording media system of the type utilizing an air bearing. The data storage of the present magnetic recording media is physically separated from the read/write head landing site, allowing the surface topology of the specialized zones to be individually optimized for either mechanical durability or data storage. Specifically, the relatively high surface roughness of the contact start stop zone exhibits excellent head glide height, stiction, and durability performance, while the relatively low surface roughness of the data zone promotes a low glide height to improve data density, minimize media noise as measured in bit shift errors, and reduce the incidence of certification errors, particularly at higher threshold percentages.

Optimization of the read/write head interface surface of magnetic recording media for both mechanical durability and high-density recording characteristics has been problematic, requiring compromises between competing criteria. In connection with the present invention, it has been discovered that friction between the read/write head and separately optimized contact start stop zone increases greatly when the contact start stop zone has a roughness (Ra)

of less than 40 Å. Conversely, surface topologies having a roughness of over 55 Å suffer head crash at a higher rate than lower roughness surfaces. Mechanical durability is optimized where the contact start stop zone has an average surface roughness in the range between 45 Å and 55 Å. It has further been discovered that recording density can be increased by limiting the average surface roughness of the data zone to 35 Å or less. Glide height, certification errors, and media noise are optimized with a data zone surface topology having an average surface roughness in the range between 15 Å and 35 Å.

In another aspect, the present invention provides improved magnetic recording media of the type having a textured surface. Such textured surfaces are generally imposed on an underlayer or the substrate of the magnetic recording media, typically by abrading an Ni—P underlayer with an abrasive tape, a diamond slurry, or the like. The improvement comprises a contact start stop zone on the textured surface having a first surface texture, and a data zone on the textured surface having a second surface texture, in which the second texture has a lower average surface roughness than the first texture. A transition zone extends between the contact start stop zone and the data zone, and has a surface texture which varies from the first texture adjacent to the contact start stop zone to the second texture adjacent to the data zone.

Generally, the transition zone will be textured at least in part during texturing of both the data zone and the contact start stop zone. As with most surface preparation procedures, the surface topology depends on which of the two textures is imposed last on the transition zone. Preferably, at least a portion of the transition zone has the second surface texture imposed over the first surface texture. Thus, the contact start stop zone should then be textured first, followed by the texturing of the data zone. This helps to ensure that most of the relatively rough texture patterns generated by the contact start stop zone texturing process within the transition zone are polished out during the data zone texturing process. Additionally, imposing the data zone texturing over the contact start stop zone texture ensures that stiction performance is not compromised, but cannot guarantee the error performance of the data zone. Conversely, imposing the contact start stop zone texturing over the data zone texture guarantees the error performance throughout the data zone, but compromises the stiction performance. Although optimized magnetic recording media require both maximum stiction and error performance, error performance can be easily and quickly tested on individual disks using a production level certifier. In contrast, verification of stiction performance requires a lengthy testing process. Therefore, it is preferable to texture the data zone last, and ensure error performance by testing.

Generally, the first and second textures are imposed by oscillating the magnetic recording media relative to an associated texturing mechanism so that the surface roughness of the transition zone varies smoothly from the first texture to the second texture. The oscillations of the latter applied texture process must be controlled to within tight tolerances, ideally being controlled to within 0.006 inch to ensure the integrity and alignment of the data zone on the recording surface.

Separately imposing the first texture on the contact start stop zone and the second texture on the data zone typically results in a disparity in height between the contact start stop zone and the data zone. The transition zone will thus often have a slope, the angle of which depends on the relative difference in heights and on the distance between the contact start stop zone and data zone. In connection with the present invention, it has been discovered that this slope of the texture zone has a significant impact on the likelihood of head crashing. Generally, the slope angle should be as low as possible, ideally being less than 0.004°.

An improved machine for texturing a zone on magnetic recording media is also provided. The texturing machine is of the type having an abrasive tape and a texture roller for biasing the abrasive tape against the magnetic recording media. The improvement comprises a step on the texture roller having a large diameter relative to a body portion. The abrasive tape rolls against the step and extends beyond the step toward the body portion of the texture roller, and is thereby locally biased against the magnetic recording media in the area of the step. Advantageously, the tape is biased against the recording media only locally at the step, allowing texturing of a limited contact start stop zone without major modifications to the texturing machine. The tape provides a gradual reduction in texturing beyond the step, particularly when the roller is oscillated relative to the recording media.

A machine for texturing magnetic recording media according to the principles of the present invention comprises a magnetic recording media restraint, an abrasive tape, and a texture roller for biasing the abrasive tape against the magnetic recording media. Additionally, an oscillation mechanism is disposed between the recording media restraint and the texture roller. The oscillation mechanism allows adjustments to oscillations with a tolerance of less than 0.006 inch. Typically, the magnetic recording media restraint allows rotation of a magnetic recording disk, while the precise control of the oscillation mechanism ensures the integrity and positioning of the contact start stop zones, transition zones, and data zones of magnetic recording media according to the principles of the present invention. Ideally, the oscillation mechanism has a tolerance of less than 0.0005 inch. Such precise control is available using an eccentric cam with threadably adjustable upper and lower cam followers.

A method for texturing a surface of magnetic recording media according to the principles of the present invention comprises texturing a contact start stop zone with a first texture, and texturing a data zone with a second surface texture. The second texture has a relatively smooth average surface roughness as compared to the first texture.

DETAILED DESCRIPTION OF THE SPECIFIC EMBODIMENTS

Figure 2:
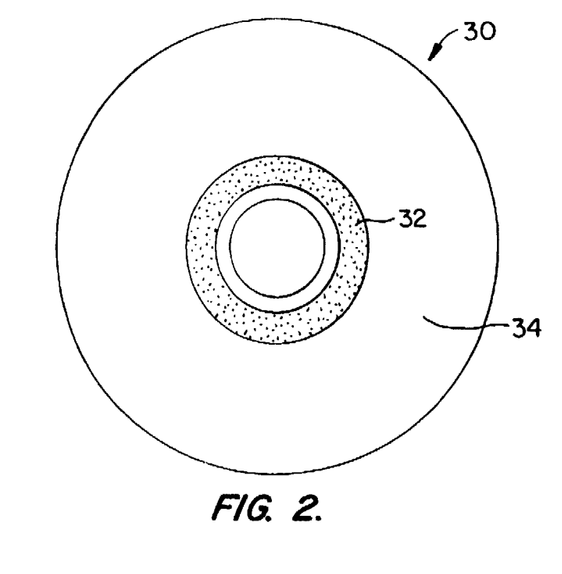
FIG. 2 is an illustration of a zone textured magnetic recording disk according to the principles of the present invention.

Referring now to FIG. 2, magnetic recording media according to the present invention will usually be in the form of a magnetic recording disk 30 having a contact start stop zone 32 and a data zone 34. These zones are distinguished by the surface texture, the properties of which will be described with reference to the outermost surface of the disk as it is used in a magnetic recording system. The actual texturing processes may be performed on the substrate, on an underlayer below the magnetic recording layers, on the magnetic recording layer itself, or on an overlayer.

Typically, an underlayer is textured, most commonly an Ni—P layer. The average surface roughness, and other surface topology described herein, refers specifically to the surface characteristics of the outermost layer, rather than the characteristics of the textured surface prior to application of any overlayers. Although the data zone is shown in an outward location, the relative radial position of the zones may be reversed. Clearly, the zone positioning must be carefully coordinated with the disk drive design.

Figure 3:
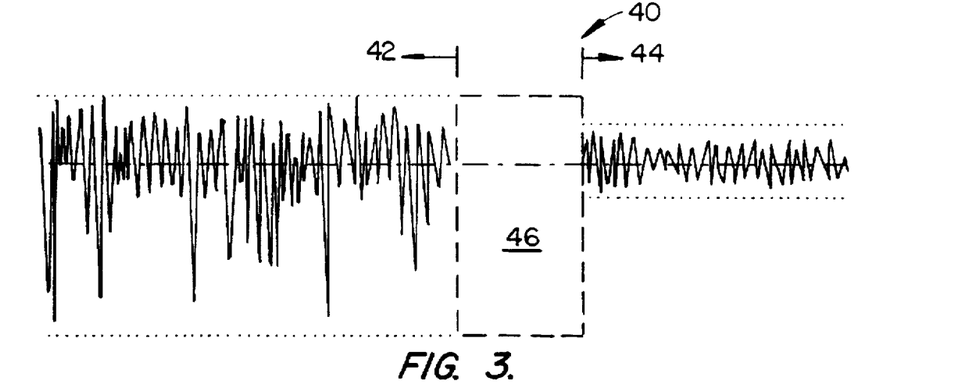
FIG. 3 schematically illustrates the texture of the contact start stop zone and data zone of the magnetic recording disk of FIG. 2.

Referring now to FIG. 3, a landing texture 42 has been imposed on contact start stop zone 32 having a relatively large average variation in absolute height and depth of the peaks and valleys. In contrast, a data texture 44 has much smaller variations in height, and therefore a lower surface roughness.

Although there is a considerable difference in the average surface roughness between the contact start stop zone and the data zone, both zones benefit from minimizing peak asperities (Rp). High peak asperities increase the air layer thickness which moves with the rotating disk, and increases the bit shift errors, thereby negatively impacting data zone performance. High peak asperities also increase the friction and wear between the contact start stop zone and the read/write head, which is deleterious to durability of the contact start stop zone.

Between landing texture 42 and data texture 44, a transition zone 46 will exhibit some of the properties of each of the adjacent textures. As described hereinbelow, texturing of either or both the landing zone 42 and data zone 44 generally involves the use of an oscillating abrasive tape or texturing slurry deposited on an absorbent pad. These oscillations create a "cross-hatched" texture pattern which is beneficial for contact start stop performance, and also allows increases in data density. Additionally, a trailing-off phenomenon occurs at the extreme of the oscillating tape due to the decrease in texturing time. Thus, the transition zone need not be independently textured, but is preferably the result of the trailing off of the contact start stop and data texturing processes. The surface finish in the transition zone depends in part on which texturing process is performed last.

Figure 4A:
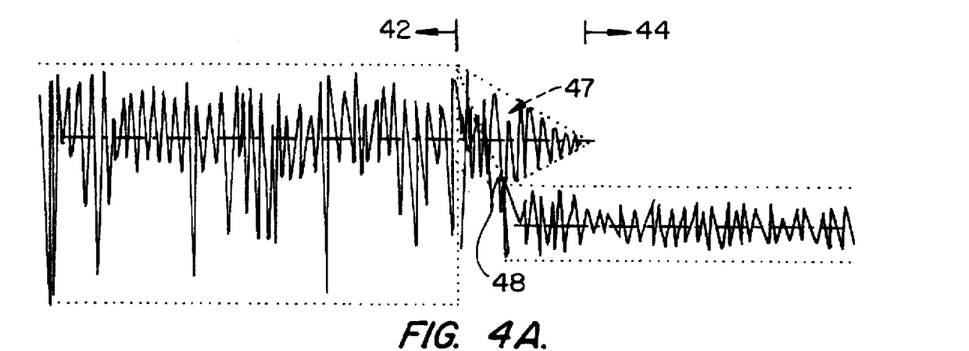
FIGS. 4A and 4B schematically illustrate alternative transitional zone surface topologies for the magnetic recording disk of FIG. 2.

Referring now to FIG. 4A, a magnetic recording media which is first textured with a landing texture 42 leaves a tapered trailing landing texture 47 imposed on at least a portion of the transition zone. Subsequent imposition of a data texture 44 substantially erases the landing texture from the transition zone, and results in a varying transition texture 48 exhibiting remnants of the landing texture. Hence, the error performance of the transition zone is left somewhat in question. Nonetheless, the stiction and mechanical performance of landing texture 42 is uncompromised.

Figure 4B:
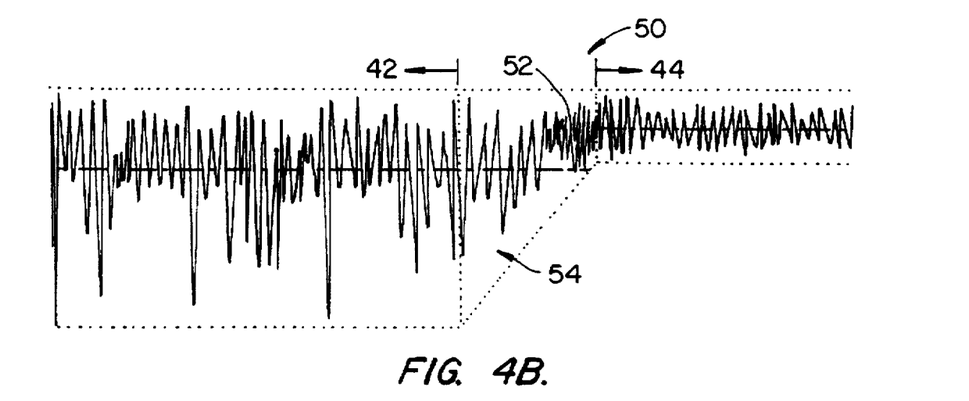

Referring now to FIG. 4B, alternative textured disk 50 has been processed by first imposing data texture 44, which extends in a tapering fashion over at least a portion of the transition zone. The landing texture 42 has then been applied over the contact start stop zone, and again extends onto at least a portion of the transition zone. The resulting transition texture 54 exhibits significant remnants of both the landing texture 42 and the data texture 44. Although error performance of the data zone remains uncompromised, the error performance throughout the transition zone cannot be guaranteed because of the remnant high roughness from the landing texture. Additionally, stiction performance remains suspect throughout the transition zone. Nonetheless, this overlapping condition can be optimized to perform acceptably.

Figures 5A, 5B, 6A:
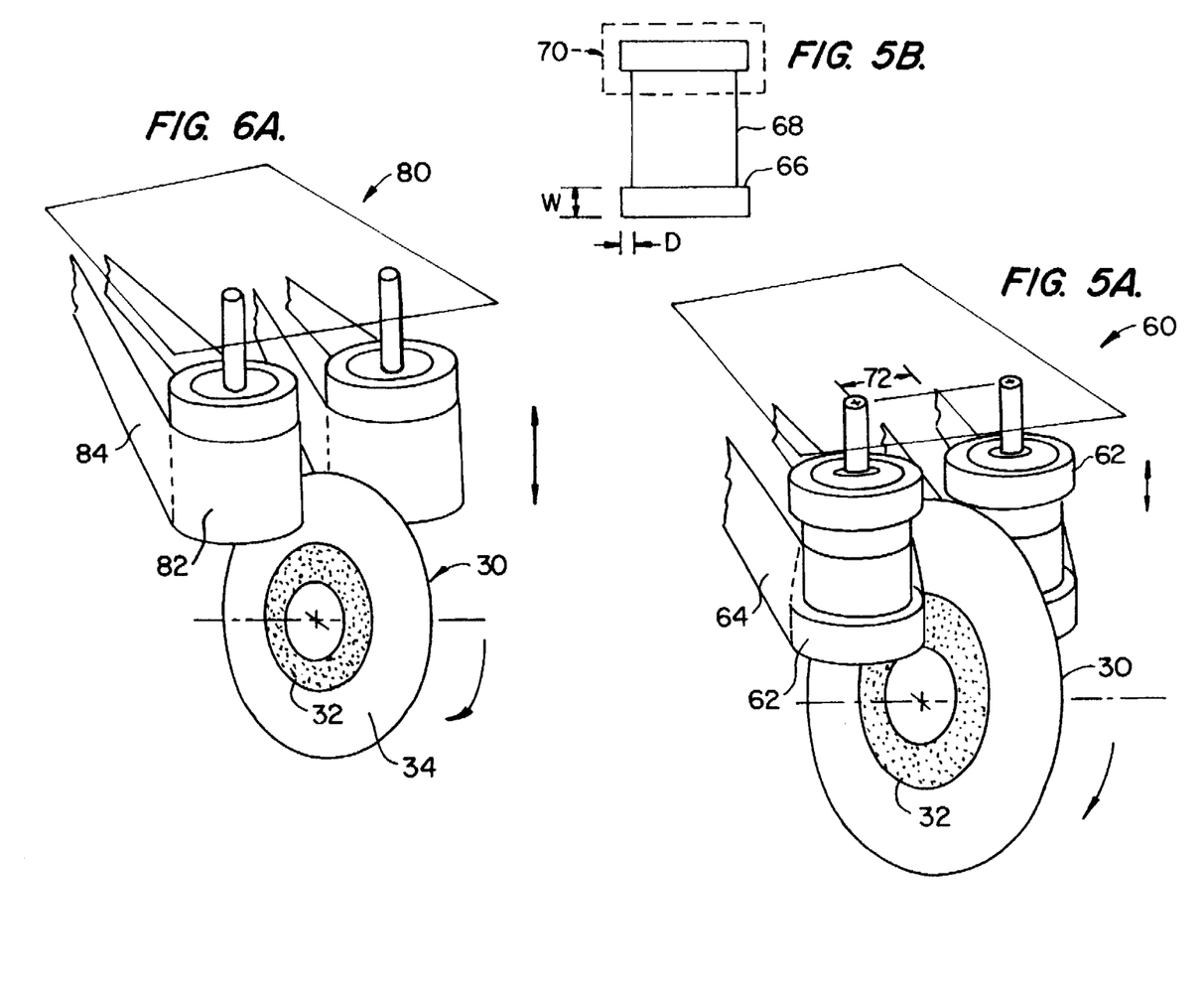
FIGS. 5A and 5B schematically illustrate a contact start stop zone texturing machine having a stepped texture roller according to the principles of the present invention.
FIGS. 6A–6D illustrate a data zone texturing machine according to the principles of the present invention.

Referring now to FIGS. 5A and 5B, a preferred landing texture machine 60 axially restrains zone texture disk 30 in contact with abrasive tapes 64. A pair of stepped rollers 62 bias abrasive tape 64 against zone texture disk 30 in the area of contact start stop zone 32. Adhesive tape 64 (shown clear for purposes of illustration) is in rolling contact with both a step 66 and body portion 68 of stepped roller 62, ensuring stability over the width of the tape. The rollers area of pressure against the disk surface is substantially limited to the step width w. Extending the abrasive tape beyond the step ensures a smooth and gradual edge on the textured zone. Alternatively, abrasive tape 64 extends beyond step 66 but does not contact body portion 68.

The roller has a specific hardness, which together with the flexibility of the abrasive tape, the depth d of step 66, and the pinch distance 72 between the roller and the disk will define an abrasion pressure profile. The hardness of the roller limits the minimum width of the step, but by reducing step depth d, the width w can be further reduced. The step is reproduced on alternative end 70 so that step roller 62 may be flipped over and reused. The abrasive tape must be thin enough to fit in between the steps so that the tape does not contact the data zone. Care must be taken so that no slippage of the tape occurs. Optionally, stepped rollers 62 and adhesive tape 64 are oscillated with respect to rotating zone textured disk 30.

Referring now to FIG. 6A through 6D, the machine for texturing a data zone comprises rollers 82 biasing fine abrasive tape 84 against zone textured disk 30. As used herein, the term "abrasive tape" specifically encompasses texturing slurry deposited on a buffing tape. The zone textured disk is again axially restrained by a disk restraint mechanism, here schematically illustrated as edge rollers 106. An alternative disk restraint mechanism restrains the axial location of the disk from the inner diameter. Rollers 82 oscillate relative to zone textured disk 30 as the disk rotates. The contact start stop zone 32 has been previously textured, hence, control over the location and oscillation characteristics of rollers 82 will define the size and surface topology characteristics of the transition zone. Such positioning will also determine the location of data zone 34, which is critical for optimal stiction and error performance. If it is placed too close to the contact start stop zone stiction may occur. Alternatively, if the data zone is placed too far from the contact start stop zone, excessive disk errors may arise.

Figure 6B:
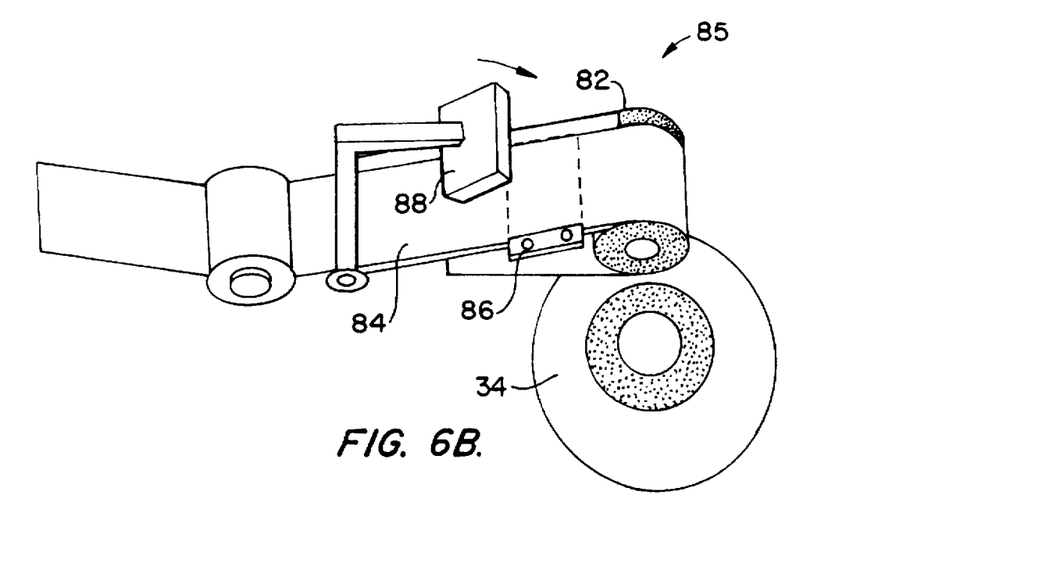

The roller location controls the position of fine abrasive tape 84. The slurry laden tape, however, tends to slip out of position if it is not properly guided at the point of use. Tape guide assembly 85, comprising a pressure pad 88 which gently pushes the lower edge of the tape against a slotted guide set 86, and thus improves tape tracking, reducing tape tracking errors by as much as 50 percent. Clearly, slotted guide set 86 must be properly positioned.

Figure 6C:
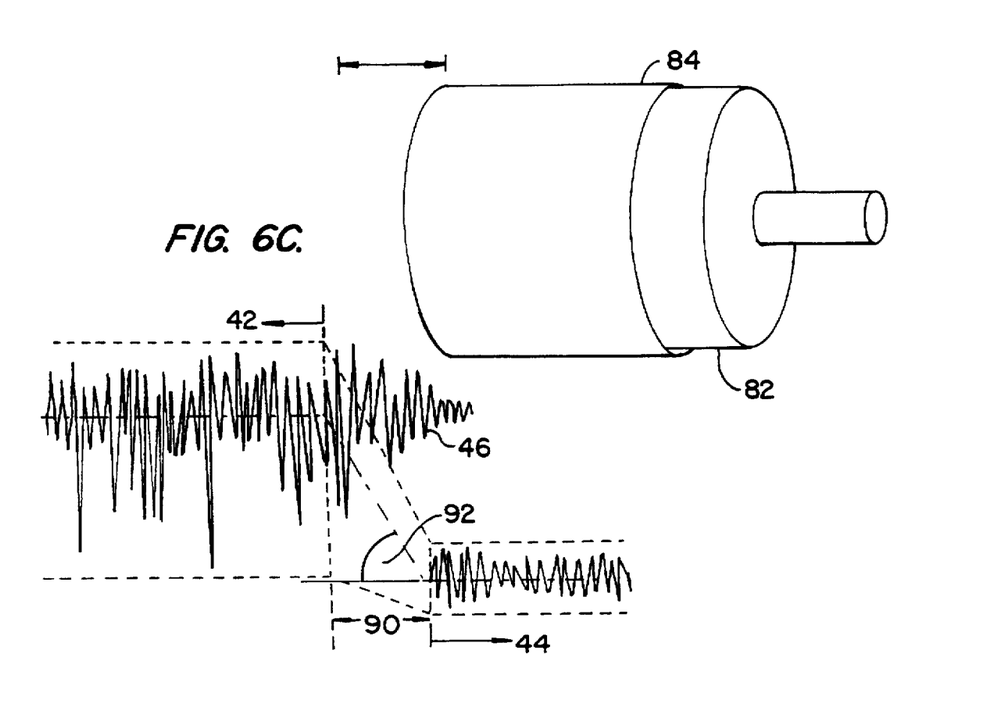

The effects of data zone texturing tape positioning is schematically illustrated in FIG. 6C. Landing texture 42 has previously been imposed on the disk, leaving tapering landing texture residue 47 on transition zone 90. As data texture 44 is imposed over the data zone, tapering landing texture residue 47 is erased, but transition zone 90 is left with a slope 92. Depending on the relative amounts of material removed during the landing texturing and data zone processes, as well as on the distance between the contact start stop zone and data zone, a large slope angle can be generated. Excessive slope 92 angles increase the incidence of head crash, particularly when slope 92 is greater than 0.004°. Thus, texturing time and pressure should be controlled to avoid removing too much material from either zone.

Figure 6D:
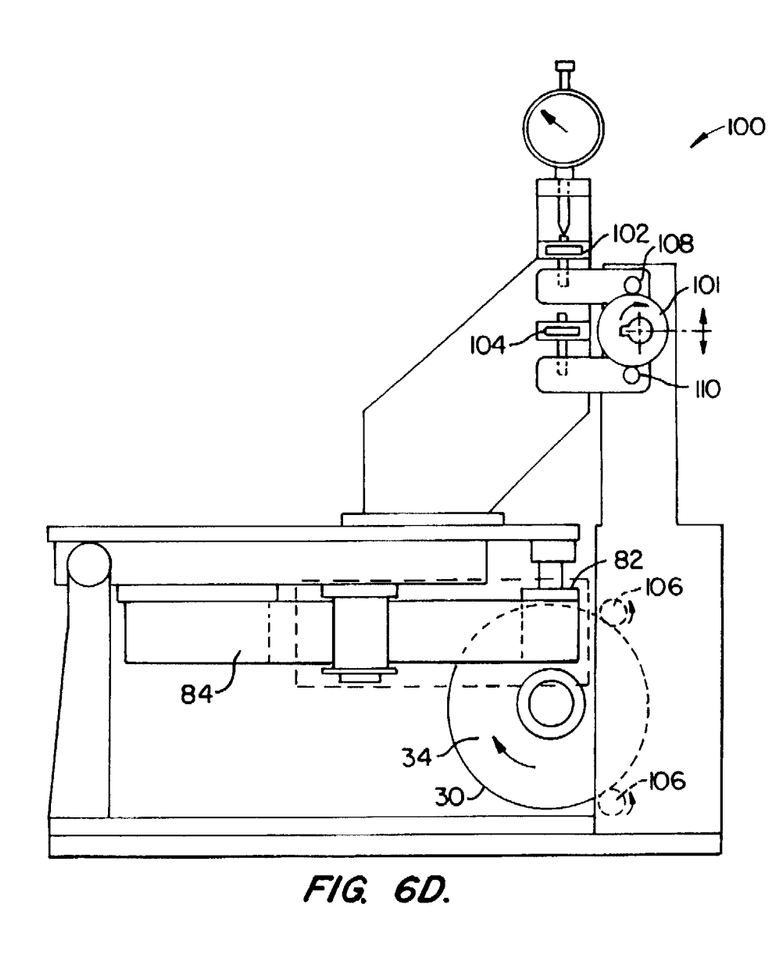

An oscillation mechanism 100 provides precise control over the limits of oscillations during texturing. Eccentric cam 101 rotates between upper and lower cam followers 108, 110. Upper and lower adjuster screws 102, 104 adjust the upper and lower cam followers 108, 110, thereby varying the height of roller 182 relative to zone textured disk 30, and hence providing control over the radial location of data zone 34. Upper and lower adjuster screws 102, 104 allow adjustment with a precision of one-half mil (the dial indicator resolution), while the data zone radial tolerance is within ±0.003 inch.

EXPERIMENTAL

Standard production quality disk substrates were plated with an Ni—P layer to a standard thickness. The Ni—P layer was zone textured in two operations: first, a contact start stop zone, and second, a data zone. All texturing was performed on modified EDC® 800HDF texturing machines.

The contact start stop zone was textured using the stepped roller described above. The disk was textured to create a contact start stop zone at an inner radial position. The final recording surface roughness of the contact start stop zone, after deposition of all layers, ranged between 45 Å and 65 Å.

The data zone was textured using a slurry laden abrasive tape which was offset from the center of the disk to an outer radial position. The tape was held in position during texturing by the tape guide described above, and oscillations were adjusted using the adjustable cam and follower mechanism. The final recording surface roughness of the data zone, after deposition of all layers, was in the range between 20 Å and 40 Å.

The disks were then sputtered with a conventional magnetic recording media layer structure. The recording surface of the disks provided a visible demarkation between the contact start stop zone and the data zone. Surface roughness measurements were performed using a Tencor Instruments® P-2 with a standard head and a 0.2 micrometer stylus. Two hundred micrometer scans were performed at maximum resolution with a 25 micrometer cut-off filter.

Figure 7:
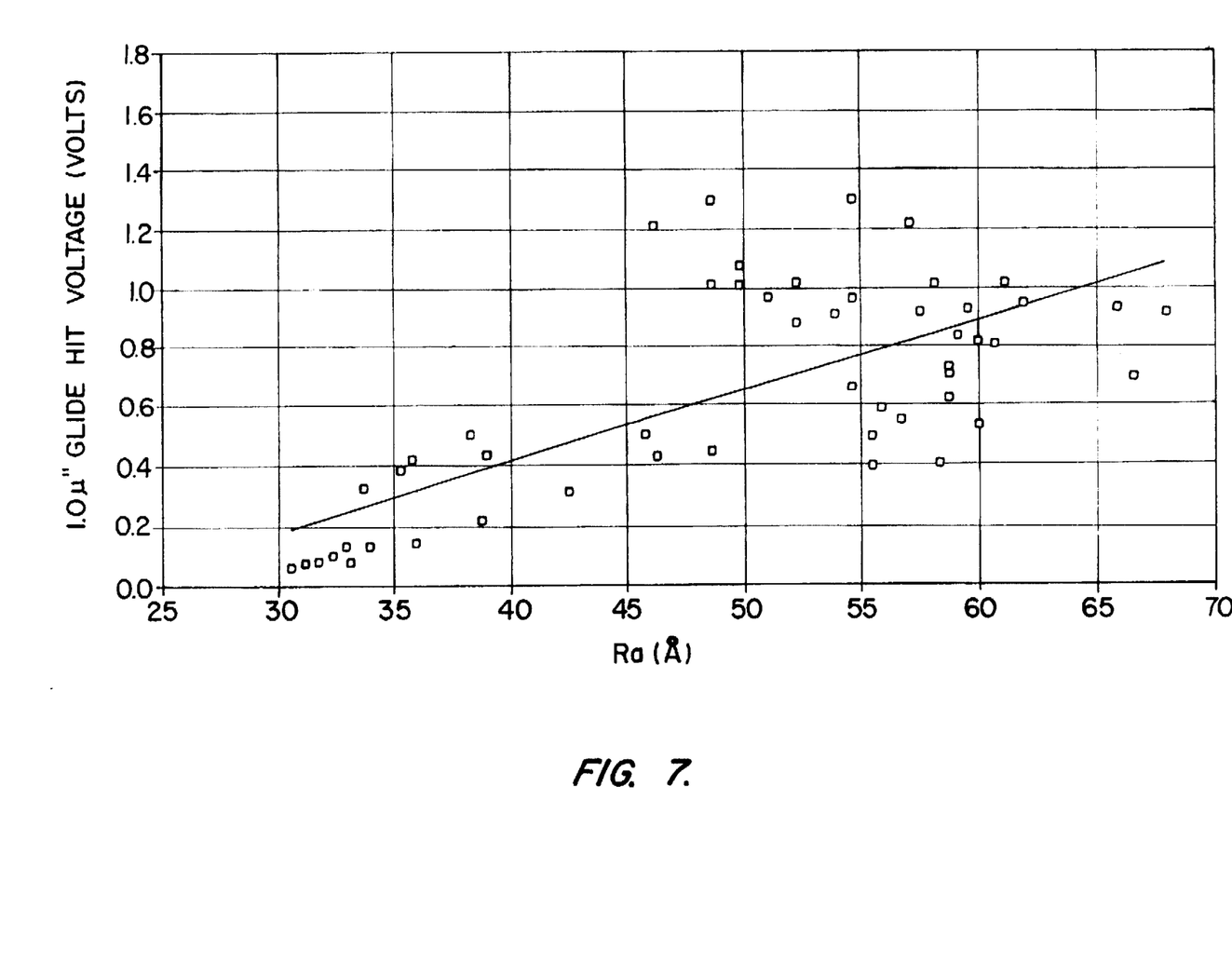
FIGS. 7–12 show experimental data, as described in detail in the Experimental Section.

The glide performance of the disks was tested by measuring the hit voltage with the head at a glide height of 1μ. The hit voltage was found to vary with the surface roughness, as shown in FIG. 7. The lower range of surface roughnesses can be seen to have lower hit voltages, and are therefore better suited to lower glide heights.

Figure 8:
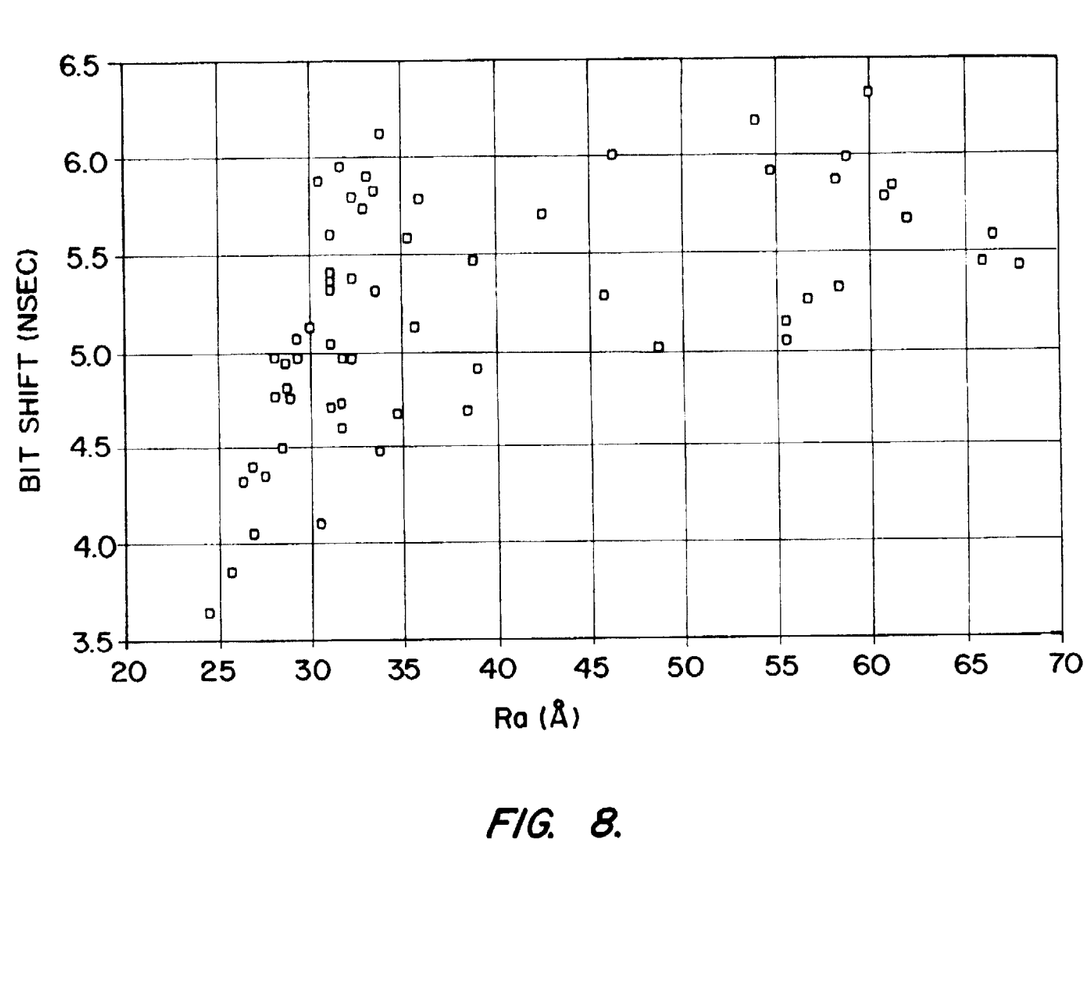
Figure 9:
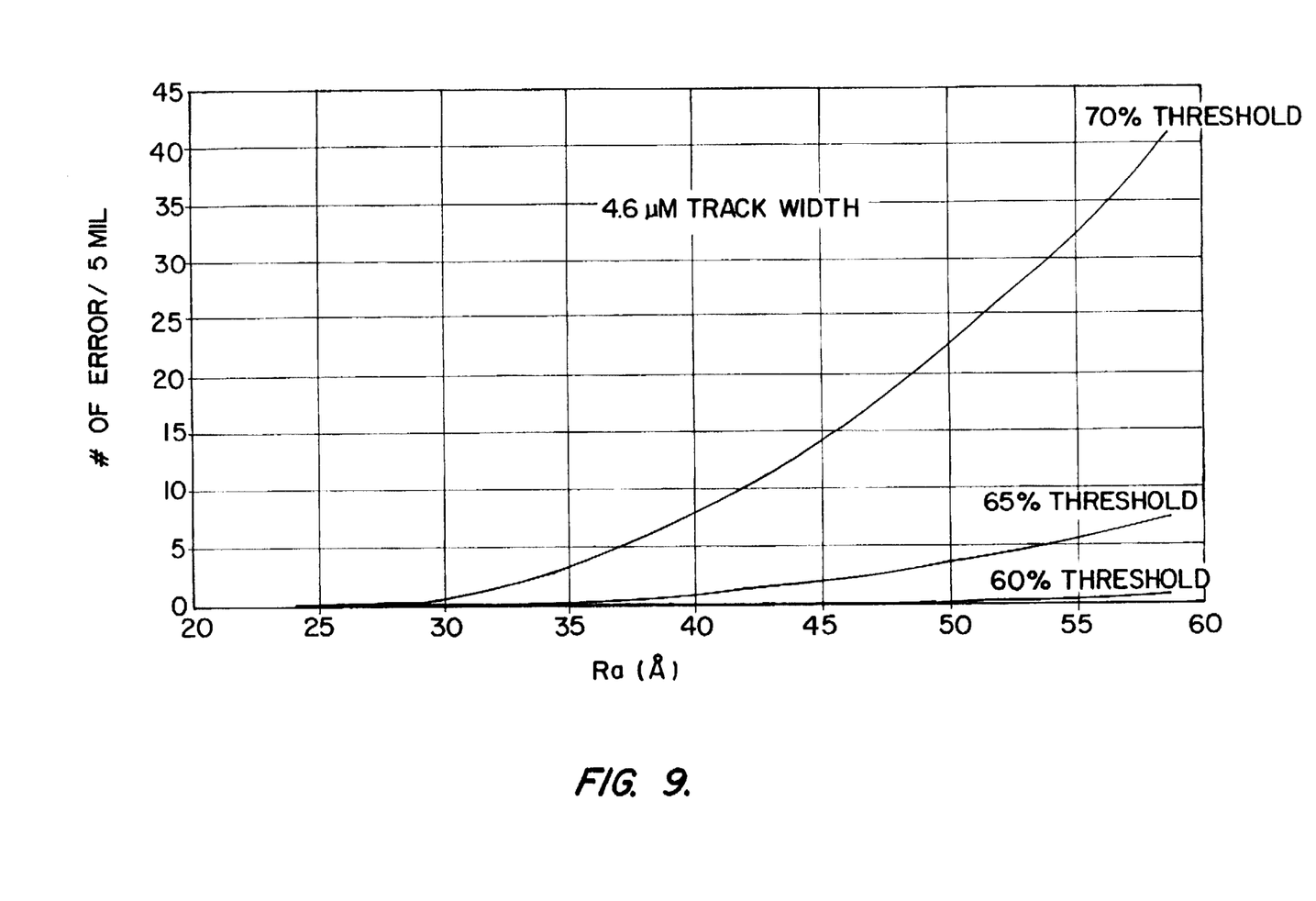

The media noise of the disks, specifically the bit-shift, was also measured as a function of surface roughness. Noise increases as roughness increases, particularly in the range from 25 Å to 35 Å, as seen in FIG. 8. Certification errors encountered at a given track were also plotted against surface roughness for a range of certification threshold percentages (see FIG. 9). Both of these plots indicate that magnetic data recording characteristics benefit from lower surface roughnesses.

Figure 10:
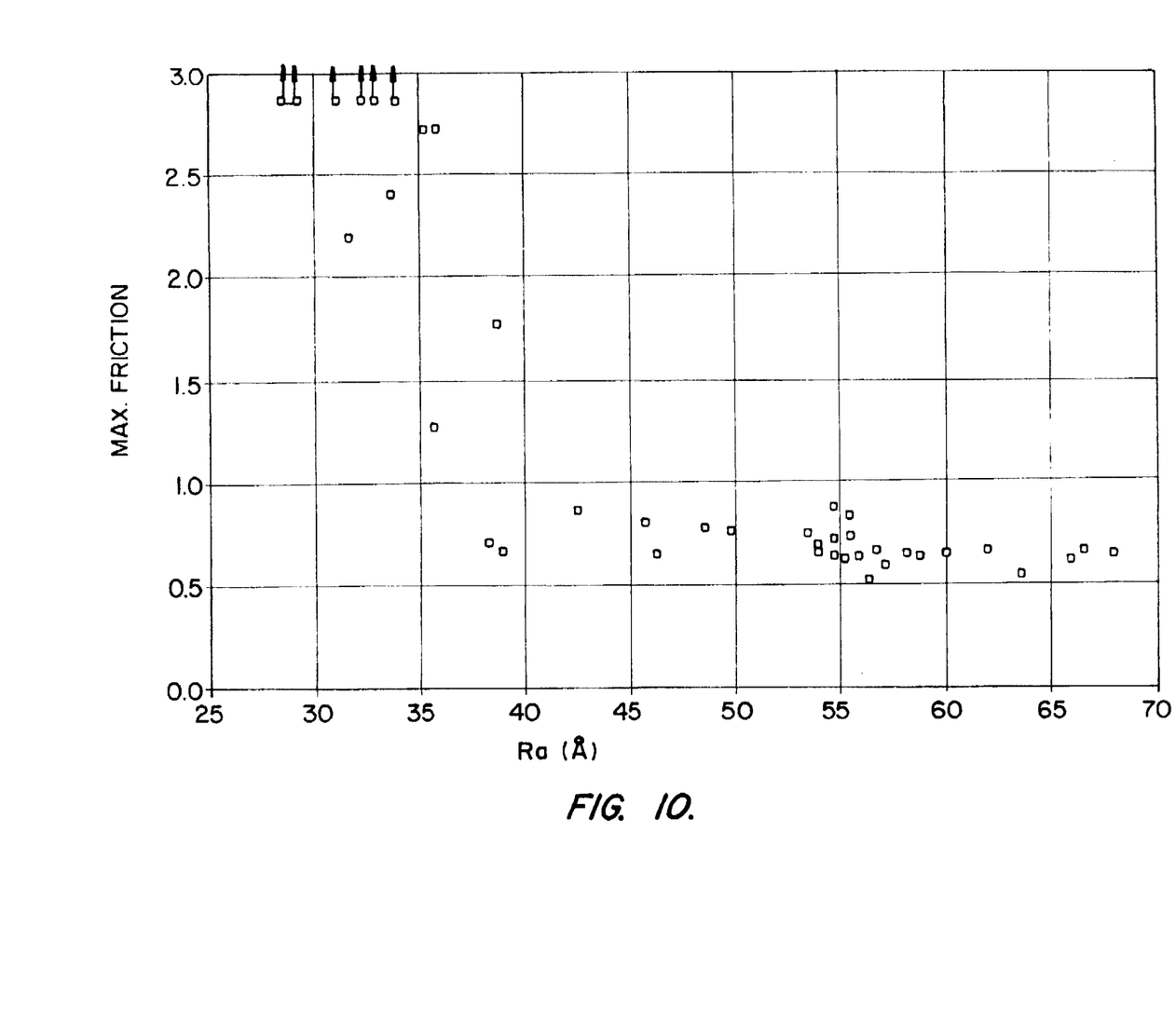

FIG. 10 is a plot of the maximum friction between the disk and the head across the range of surface roughness. Friction can be seen to increase significantly for surface roughnesses below 40 Å. Surface roughnesses greater than this value are thus preferred where the disk and head will be in sliding contact.

Figure 11:
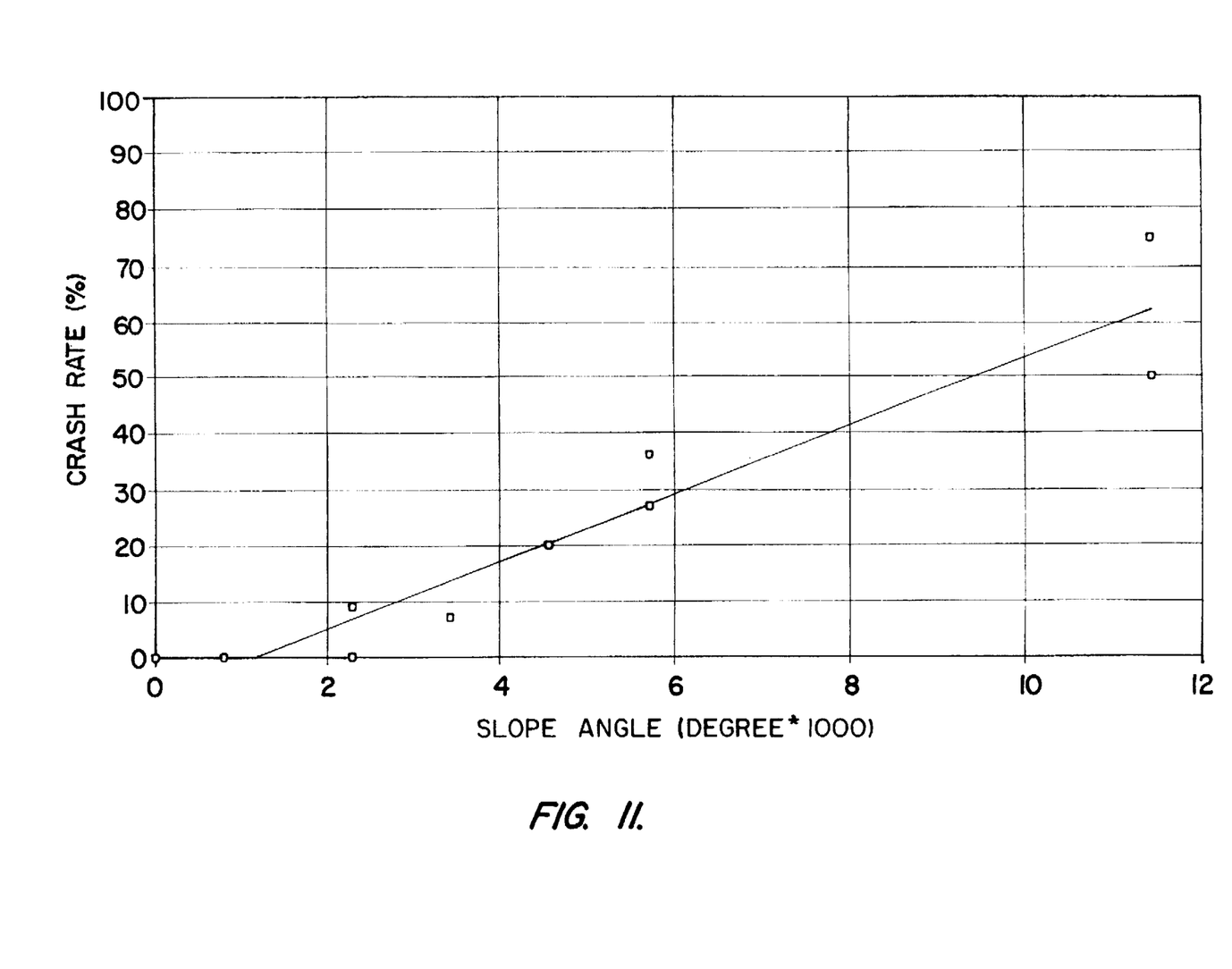
Figure 12:
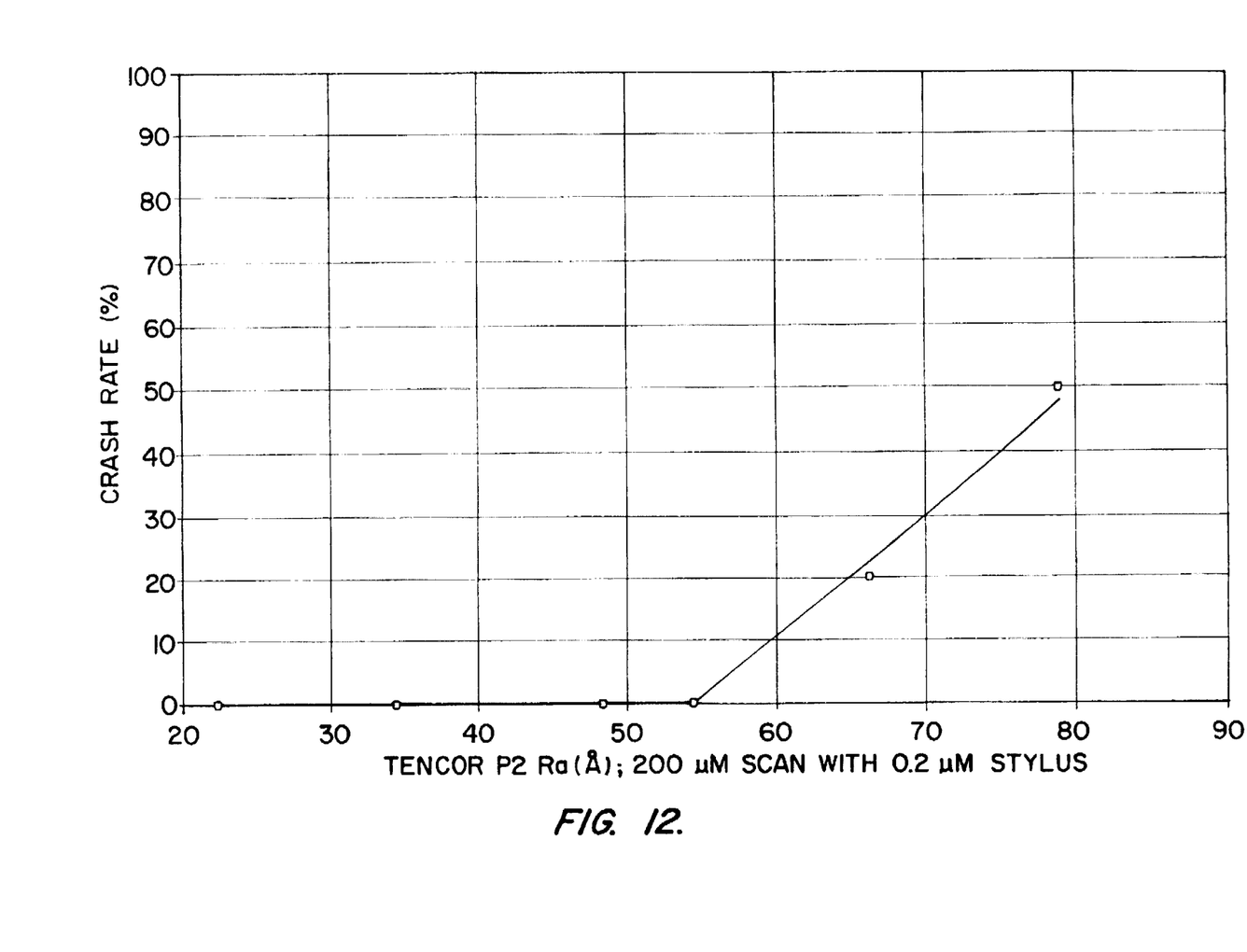

The slope of the transition zone varied with the relative amounts of Ni—P stock removed during the texturing processes. FIG. 11 is a plot of the incidence of head crash against the transition slope angle. Head crash rate was also found to vary with the surface roughness, the crash rate increasing significantly for roughnesses of over 55 Å, as seen in FIG. 12.

Although the foregoing invention has been described in some detail by way of illustration and example, for purposes of clarity and understanding, certain modifications will be obvious to those of skill in the art. For example, a physical, mechanical, or chemical mask may cover one zone (either the contact start stop zone or data zone) while the other is being textured. It should be noted that the entire zone need not be masked, rather, only the regions closest to the transition region. A physical mask might comprise a special spindle chuck system which hides either a contact start stop or data zone on the disk surface. Alternatively, a mechanical mask might comprise an edge surface which limited the roller or tape motion as it approached the transition zone region. One must be careful to avoid inhibiting the motion to such a degree that the overall texturing pattern is affected. A chemical mask comprises a protective layer at a given zone position which is worn away during texturing, but which protects the disk's surface underneath. Additional process steps are required both for adding a protective coating, and for removal of excess material after texturing. Such modifications may be practiced within the scope of the present invention, which is limited solely by the appended claims.

What is claimed is:

1. Magnetic recording media comprising a read/write head interaction surface including
   - a contact start stop zone having a first abraided texture with a first Ra surface roughness to improve durability,
   - a data zone having a second abraided texture with a second Ra surface roughness which is lower than the first surface roughness to improve magnetic recording characteristics, and
   - a transition zone between the contact start stop zone and the data zone,
   - at least a portion of the transition zone having both the first texture and the second texture overlapping thereon so that the transition zone has an Ra surface roughness which varies gradually from the first surface roughness adjacent the contact start stop zone to the second surface roughness adjacent the data zone,
   - wherein both the first and second textures comprise cross-hatched textures.

2. Magnetic recording media as claimed in claim 1, wherein the first surface roughness is at least 40 Å.

3. Magnetic recording media as claimed in claim 2, wherein the second surface roughness is less than 35 Å.

4. Magnetic recording media as claimed in claim 1, wherein the first surface roughness is in the range between 45 Å and 55 Å, and wherein the second surface roughness is in the range between 15 Å and 35 Å.

5. Magnetic recording media as claimed in claim 1, wherein the slope of the head interaction surface rising between the contact start stop zone and the data zone is less than 0.004°.

6. Magnetic recording media as claimed in claim 1, wherein the at least one cross-hatched texture ends gradually along the transition layer to gradually vary the surface roughness.

7. Magnetic recording media as claimed in claim 1, wherein both the first and second textures comprise cross-hatched textures which end gradually along the transition layer, and wherein a portion of the second texture is imposed over the first texture to maintain stiction performance of the media.

8. Improved magnetic recording media having a textured surface, the improvement comprising:

- a contact start stop zone on the textured surface having a first surface texture with a surface Ra;
- a data zone on the textured surface having a second surface texture with a lower Ra surface roughness than the first texture, the second surface texture being cross-hatched;
- a transition zone extending between the contact start stop zone and the data zone, the transition zone having a transition surface texture with an Ra surface roughness which varies from the Ra surface roughness of the first texture adjacent to the contact start stop zone, to the Ra surface roughness of the second texture adjacent to the data zone;
- said transition zone having a slope angle no greater than 0.004° from the contact start stop zone to the data zone.

9. Improved magnetic recording media as claimed in claim 8, wherein the second texture is imposed after the first texture.

10. Improved magnetic recording media as claimed in claim 8, wherein a slope of the transition zone rising from the contact start stop zone to the data zone is less than 0.004°.

11. Improved magnetic recording media as claimed in claim 8, wherein the first texture has an average surface roughness in the range between 45 Å and 55 Å, and wherein the second texture has an average surface roughness in the range between 15 Å and 35 Å.

12. Magnetic recording media comprising a read/write head interaction surface including a contact start stop zone having an Ra surface roughness to improve durability, and a data zone having a lower Ra surface roughness than the contact start stop zone to improve magnetic recording characteristics, wherein at least one of the contact start stop zone and the data zone has a cross-hatched surface texture imposed by oscillating one member of the group consisting of a layer below the magnetic layer of the magnetic recording media and a texturing abrasive mechanism relative to the other member during texturing so that the transition zone of the head interaction surface varies gradually in surface texture between the contact start stop zone and the data zone.

13. Improved magnetic recording media having a textured surface, the improvement comprising:

- a contact start stop zone on the textured surface resulting from a first surface texture;
- a data zone on the textured surface resulting from a second surface texture with a lower Ra surface roughness than the first texture, the second surface texture being cross-hatched;
- a transition zone extending between the contact start stop zone and the data zone, the transition zone defined by a transition surface texture which varies from the first texture adjacent to the contact start stop zone, to the second texture adjacent to the data surface texture, wherein at least a portion of the transition zone has the second surface texture imposed over the first surface texture.

14. Improved magnetic recording media as claimed in claim 13, wherein at least one of the first and second textures is imposed by oscillating one member of the group comprising a layer of the magnetic recording media and an associated texturing mechanism relative to the other member during texturing so that the surface roughness of the transition zone varies gradually from the first texture to the second texture, and wherein oscillations are controlled to within 0.006 inch during texturing.

15. Magnetic recording media comprising a read/write head interaction surface including

- a contact start stop zone having a first abraided texture with a first Ra surface roughness to improve durability, said first roughness in the range between about 40 Å and 55 Å;
- a data zone having a second abraided texture with a second Ra surface roughness is less than 35 Å to improve magnetic recording characteristics; and
- a transition zone between the contact start stop zone and the data zone;
- at least a portion of the transition zone having both the first texture and the second texture overlapping thereon so that the transition zone has an Ra surface roughness which varies gradually from the first surface roughness adjacent the contact start stop zone to the second surface roughness adjacent the data zone;
- wherein the first texture and second texture comprise of cross-hatched texture formed at least in part by mechanical texturing.

* * * * *